United States Patent (12)
Tyler et al.

(10) Patent No.: US 11,404,751 B2
(45) Date of Patent: *Aug. 2, 2022

(54) BATTERY MODULE

(71) Applicant: CPS Technology Holdings LLC, New York, NY (US)

(72) Inventors: Matthew R. Tyler, New York, NY (US); John P. Dinkelman, South Milwaukee, WI (US)

(73) Assignee: CPS Technology Holdings LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/907,812

(22) Filed: Jun. 22, 2020

(65) Prior Publication Data
US 2021/0013479 A1    Jan. 14, 2021

Related U.S. Application Data

(60) Continuation of application No. 15/908,598, filed on Feb. 28, 2018, now Pat. No. 10,714,730, which is a
(Continued)

(51) Int. Cl.
*H01M 6/42*     (2006.01)
*H01M 50/502*   (2021.01)
(Continued)

(52) U.S. Cl.
CPC ......... *H01M 50/502* (2021.01); *B23K 26/323* (2015.10); *H01M 50/528* (2021.01);
(Continued)

(58) Field of Classification Search
CPC ............. H01M 50/502; H01M 50/528; H01M 50/529; H01M 50/542; H01M 50/543;
(Continued)

(56) References Cited

U.S. PATENT DOCUMENTS 6,270,361 B1   8/2001  Onizuka et al.
7,766,673 B1   8/2010  Dumont et al.
(Continued)

FOREIGN PATENT DOCUMENTS

CN   201413850    2/2010
CN   104321905    1/2015
(Continued)

OTHER PUBLICATIONS

PCT/US2016/017911 Invitation to Pay Additional Fees dated May 18, 2016.
Youxing Song, "Welding Technology", Dec. 31, 1989, p. 242.

*Primary Examiner* — Raymond Alejandro
(74) *Attorney, Agent, or Firm* — Boardman & Clark LLP

(57) ABSTRACT

A battery module that includes a stack of battery cells, where each battery cell has a terminal, and the terminal has a first alloy of a metal. The battery module has a bus bar that includes a body having a second alloy of the metal, nickel plating on at least a portion of the body, and an indentation disposed on the body, where a thickness of the nickel plating is between 0.2% and 20% of an overall thickness of the body, and a weld physically and electrically coupling the respective terminal to the bus bar. The indentation has a depth between 10% and 90% of the overall thickness, an area of the indentation is between 5% and 20% of an overall area of the body, and the nickel plating enables the weld to be stronger than a weld between the first and second alloys.

20 Claims, 7 Drawing Sheets

Related U.S. Application Data division of application No. 14/843,570, filed on Sep. 2, 2015, now Pat. No. 9,917,291.

(60) Provisional application No. 62/157,369, filed on May 5, 2015.

(51) Int. Cl.

| | | |
|---|---|---|
| *H01M 50/528* | (2021.01) | |
| *H01M 50/543* | (2021.01) | |
| *B23K 26/323* | (2014.01) | |
| *B23K 101/36* | (2006.01) | |
| *H01M 10/052* | (2010.01) | |
| *H01M 10/48* | (2006.01) | |
| *H01M 50/20* | (2021.01) | |

(52) U.S. Cl.
CPC ....... *H01M 50/543* (2021.01); *B23K 2101/36* (2018.08); *H01M 10/052* (2013.01); *H01M 10/48* (2013.01); *H01M 50/20* (2021.01); *H01M 2220/20* (2013.01); *Y02E 60/10* (2013.01)

(58) Field of Classification Search
CPC .... H01M 50/20; H01M 10/052; H01M 10/48; H01M 2220/20; B23K 26/323; B23K 2101/36; Y02E 60/10
See application file for complete search history.

(56) References Cited

U.S. PATENT DOCUMENTS

| | | | |
|---|---|---|---|
| 9,142,823 B2 | 9/2015 | Moon et al. | |
| 9,368,882 B2 | 6/2016 | Lumetta | |
| 9,917,291 B2 * | 3/2018 | Tyler | ............... H01M 50/543 |
| 2001/0049054 A1 | 12/2001 | Enomoto et al. | |
| 2009/0297939 A1 | 12/2009 | Yoon | |
| 2011/0020690 A1 | 1/2011 | Khakhalev et al. | |
| 2012/0214060 A1 | 8/2012 | Taguchi et al. | |
| 2015/0064544 A1 | 3/2015 | Park | |
| 2015/0093607 A1 * | 4/2015 | Kuriyama | ............. H01M 50/20 |
| | | | 429/54 |
| 2015/0180004 A1 * | 6/2015 | Harayama | ............. H01M 50/55 |
| | | | 429/158 |
| 2015/0325818 A1 * | 11/2015 | Suzuki | ............... H01M 50/105 |
| | | | 429/186 |
| 2016/0072117 A1 | 3/2016 | Sim | |
| 2016/0141583 A1 | 5/2016 | Kim et al. | |
| 2016/0190541 A1 * | 6/2016 | Hoshino | ............. H01M 50/317 |
| | | | 429/61 |

FOREIGN PATENT DOCUMENTS

| | | |
|---|---|---|
| EP | 2738838 | 6/2014 |
| JP | H04284351 | 10/1992 |
| JP | 2000223095 | 8/2000 |
| JP | 2000223098 | 8/2000 |
| JP | 2004227954 A | 8/2004 |
| JP | 2010067582 A | 3/2010 |
| JP | 2015187910 | 10/2015 |
| KR | 20150024560 | 3/2015 |
| WO | 2014024430 | 2/2014 |

\* cited by examiner

BATTERY MODULE

CROSS-REFERENCE TO RELATED APPLICATION

This application is a continuation of U.S. patent application Ser. No. 15/908,598, filed Feb. 28, 2018, entitled "WELDING PROCESS FOR A BATTERY MODULE", now U.S. Pat. No. 10,714,730, issued Jul. 14, 2020, which is a divisional of U.S. patent application Ser. No. 14/843,570, filed Sep. 2, 2015, entitled "WELDING PROCESS FOR A BATTERY MODULE," now U.S. Pat. No. 9,917,291, issued Mar. 13, 2018, which claims priority from and the benefit of U.S. Provisional Application No. 62/157,369, filed May 5, 2015, entitled "CELL TO CELL BUS BAR WELDING, BUS BAR GEOMETRY AND NICKEL PLATING SPECIFICATION FOR LASER WELDING." which are hereby incorporated by reference in their entireties for all purposes.

BACKGROUND

The present disclosure relates generally to the field of batteries and battery modules. More specifically, the present disclosure relates to a welding process for a battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include a number of interconnected electrochemical cells coupled together via bus bars extending between terminals of the electrochemical cells (e.g., cell terminals). In some cases, the terminals of the electrochemical cells and the bus bars may include different materials. Therefore, welding the bus bars to the terminals using traditional welding techniques may result in a weak electrical connection and/or physical connection. Accordingly, it is now recognized that an improved welding process for establishing a stronger electrical and physical connection between the terminals and the bus bars is desirable.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module that includes a stack of battery cells disposed in a housing, where each battery cell of the stack of battery cells has a terminal, and where the terminal has a first alloy of a metal. The battery module also includes a bus bar that includes a body having a second alloy of the metal, nickel plating on at least a portion of the body, and an indentation disposed in the body, where a thickness of the nickel plating is between 0.2% and 20% of an overall thickness of the body. The battery module has a weld physically and electrically coupling the respective terminal of a battery cell of the stack of battery cells to the bus bar, where the indentation has a depth at the weld between 10% and 90% of the overall thickness of the body, an area of the indentation is between 5% and 20% of an overall area of the body, and the nickel plating enables the lap weld to be stronger than a direct weld between the first alloy of the metal and the second alloy of the metal.

The present disclosure also relates to a battery module that includes a lithium ion battery cell disposed in a housing, where the lithium ion battery cell has a terminal, and where the terminal includes a first alloy of a metal. The battery module also includes a bus bar that includes a body that has a second alloy of the metal, nickel plating on at least a portion of a perimeter of the body, and an indentation disposed in the body, where a thickness of the nickel plating is between 0.2% and 20% of an overall thickness of the body, and wherein a phosphorous concentration of the nickel plating is between 1 weight percent and 15 weight percent. The battery module further includes a weld physically and electrically coupling the terminal and the bus bar to one another, where the weld is produced according to a process that includes disposing the bus bar over the terminal such that a first surface of the bus bar is adjacent to a second surface of the terminal, directing a predetermined amount of point specific energy from a power source toward the indentation to form a weld spot, directing a stream of nitrogen gas toward the weld spot, and melting at least a portion of the first surface of the bus bar at the weld spot to form a weld such that the a terminal and the bus bar are coupled to one another. The nickel plating enables the weld to be stronger than a direct weld between the first alloy of the metal and the second alloy of the metal.

The present disclosure also relates to a method for laser welding a bus bar to a terminal of an electrochemical cell that includes disposing the bus bar over the terminal such that a first surface of the bus bar is adjacent to a second surface of the terminal, where the bus bar includes a body having a first alloy of a metal and the terminal has a second alloy of the metal. The method also includes directing a predetermined amount of point specific energy from a power source toward an indentation disposed in the body of the bus bar to form a weld spot, where the indentation has a depth between 10% and 90% of an overall thickness of the body and an area of the indentation is between 5% and 20% of an overall area of the body of the bus bar, directing a stream of nitrogen gas toward the weld spot, and melting at least a portion of the first surface of the bus bar at the weld spot to form a weld such that the terminal and the bus bar are coupled to one another. The nickel plating enables the weld to be stronger than a direct weld between the first alloy of the metal and the second alloy of the metal.

DRAWINGS

Various aspects of this disclosure may be better understood upon reading the following detailed description and upon reference to the drawings in which.

Figure 3:
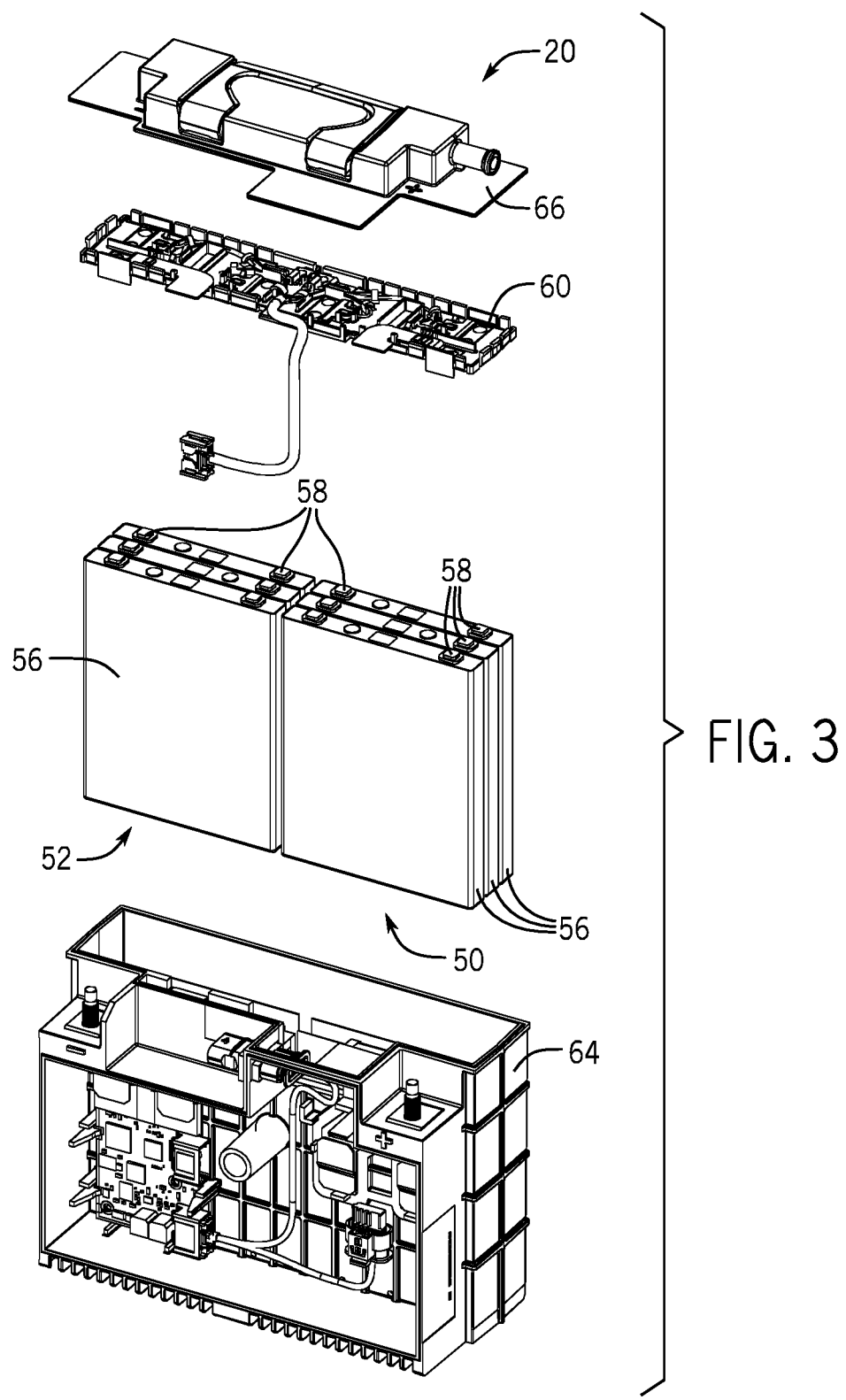
FIG. 3 is an exploded perspective view of an embodiment of the battery module of FIG. 2 that may include one or more welds formed using presently disclosed techniques, in accordance with an aspect of the present disclosure.
Figure 5:
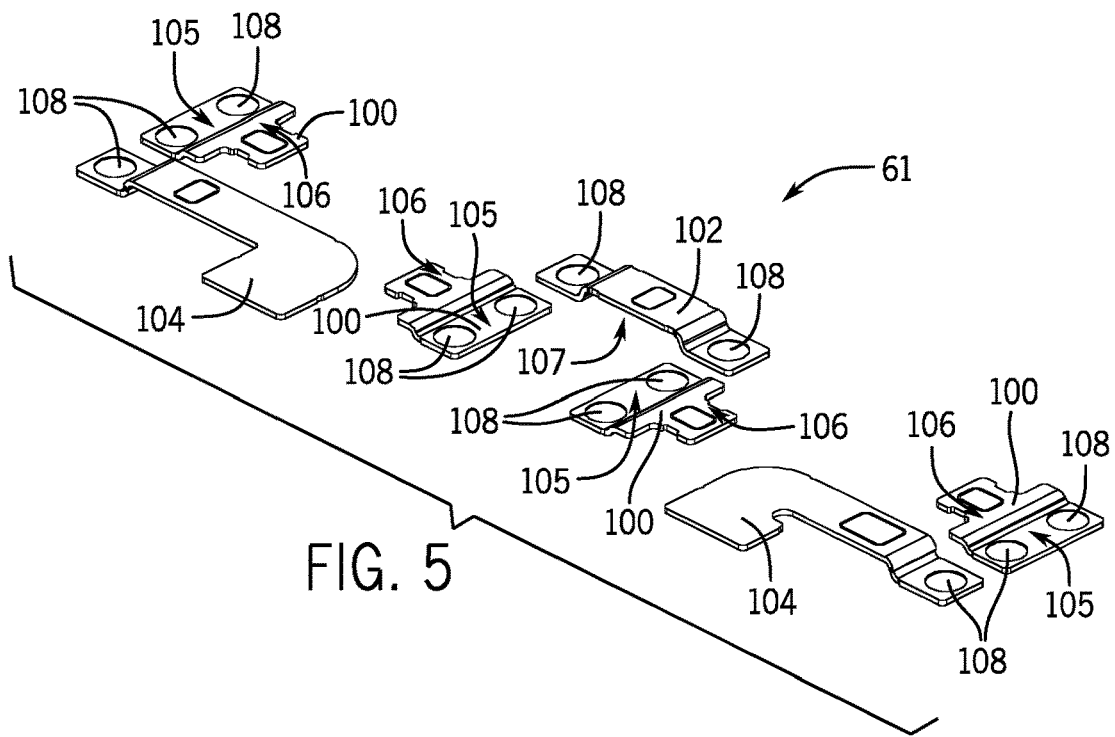
FIG. 5 is a perspective view of embodiments of various bus bars that may be used in the battery module of FIG. 3, including a cell-to-cell bus bar, a stack-to-stack bus bar, and a cell-to-load bus bar, in accordance with an aspect of the present disclosure.
Figure 10:
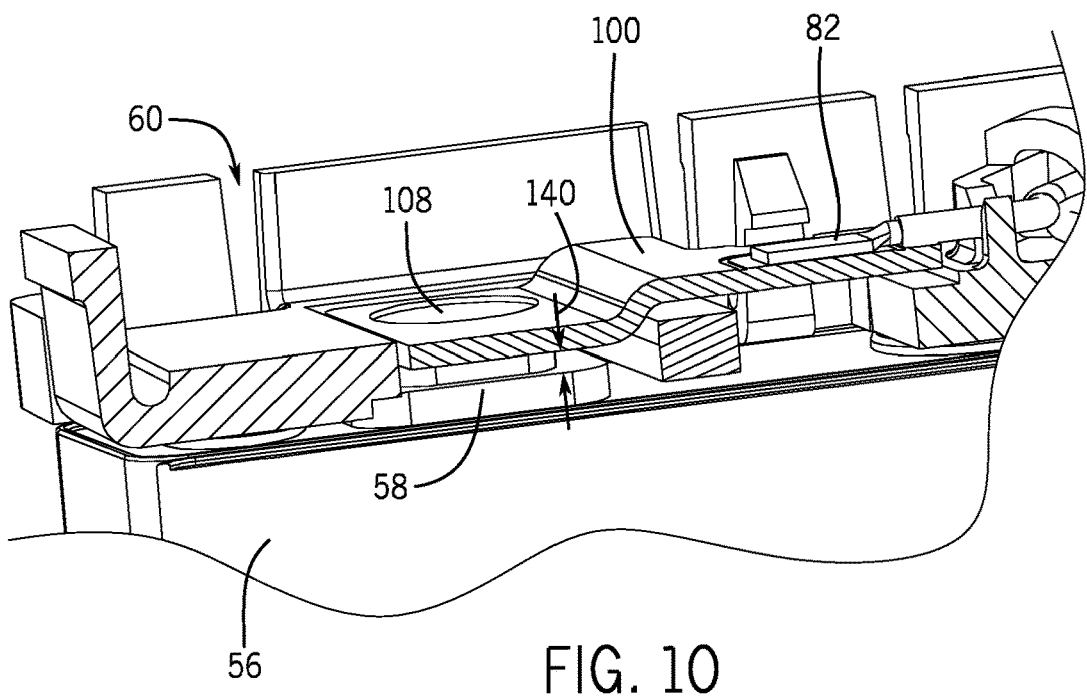
Figure 11:
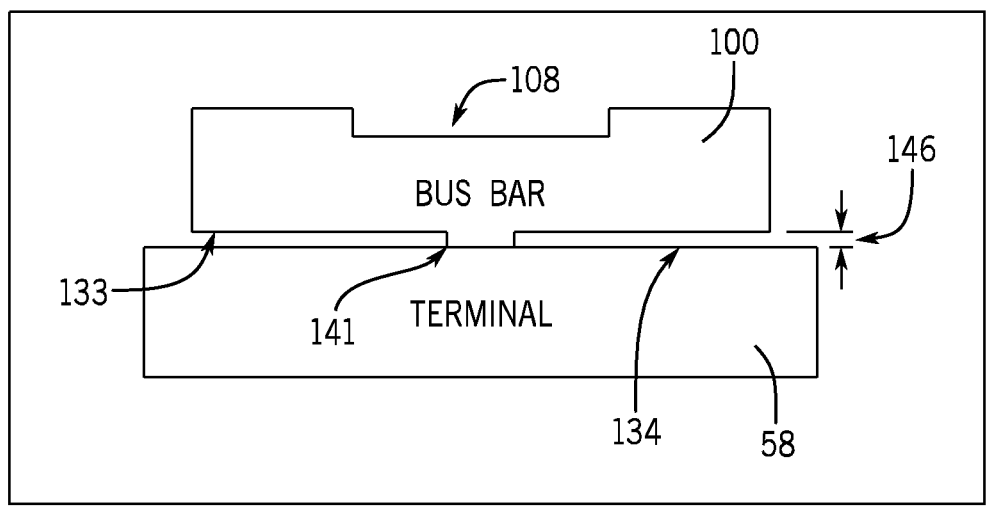

FIG. 10 is a cross-sectional view of a lap weld between a portion of one of the cell-to-cell bus bars of FIG. 5 and a cell terminal of the battery module of FIG. 3, in accordance with an aspect of the present disclosure; and FIG. 11 is a cross-sectional view of a bus bar having a tab extending from the bus bar and contacting a cell terminal to form a gap between the bus bar and the cell terminal, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

Connections established between various conductive components of a battery module may be metallurgical, and may be formed using welding techniques, or other suitable techniques. Unfortunately, some of these connections may be difficult to make, or may be less than optimal because of the presence of dissimilar materials present in the battery module. For example, cell terminals may include a first alloy of a metal (e.g., 5052 aluminum), while bus bars may include a second alloy of the metal (e.g., 1100 aluminum). In certain embodiments, the first alloy of the metal may be 5052 aluminum, which may include a mixture of aluminum magnesium, chromium, copper, iron, manganese, silicon, and/or zinc. The second alloy of the metal may be 1100 aluminum, which may include a mixture of aluminum, magnesium, chromium, copper, iron, manganese, silicon, and/or zinc. Accordingly, in such embodiments, the 1100 aluminum may be a more pure aluminum, whereas the 5052 aluminum may be a more diluted aluminum.

Although it may seem desirable to directly couple dissimilar conductive materials together, such connections may be subject to unwanted galvanic effects (e.g., corrosion), which can degrade the connections. Additionally, coupling dissimilar materials may result in a weak electrical connection and/or physical connection (e.g., cracks). Accordingly, it is now recognized that an improved welding technique between dissimilar conductive materials (e.g., different alloys of aluminum) are desirable, for example to enhance the stability and lifetime of the battery. In the case of 5052 aluminum and 1100 aluminum, the different alloy materials associated with the aluminum may prevent the formation of a robust connection.

Presently disclosed embodiments are generally directed toward an improved technique for welding terminals of electrochemical cells having a first conductive material to one or more bus bars having a second conductive material. The use of the term "welding" in the present disclosure is intended to encompass any suitable method (or bond resulting from any such method) for coupling two conductive materials (e.g., metals or metal-containing materials) together. Non-limiting examples of methods encompassed by the present disclosure include ultrasonic welding, laser welding, gas metal arc welding (GMAW), metal inert gas (MIG) welding, tungsten inert gas (TIG) welding, arc welding, friction welding, and so forth. Although the present disclosure focuses discussion on applying the disclosed techniques to a lithium ion battery module, it should be recognized that the lithium ion battery module is but one example of a module that may be subject to one or more aspects of the present disclosure, and should not be considered to limit the present disclosure to one specific module configuration.

Figure 1:
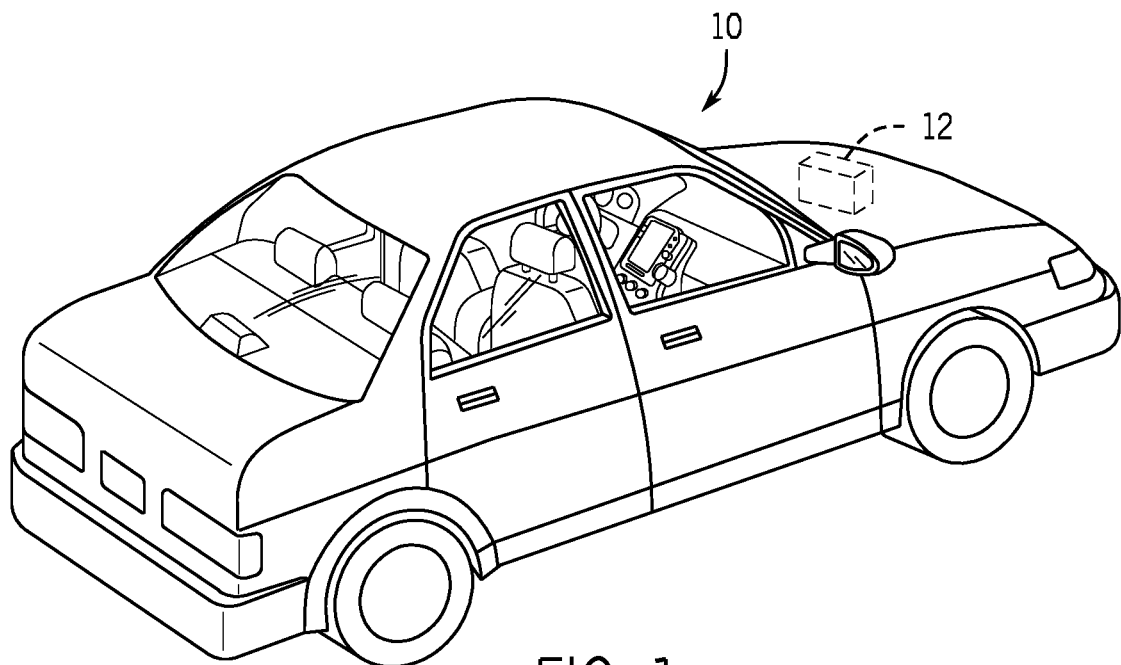
FIG. 1 is a perspective view of a vehicle having a battery system configured in accordance with present embodiments to provide power for various components of the vehicle, in accordance with an aspect of the present disclosure.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
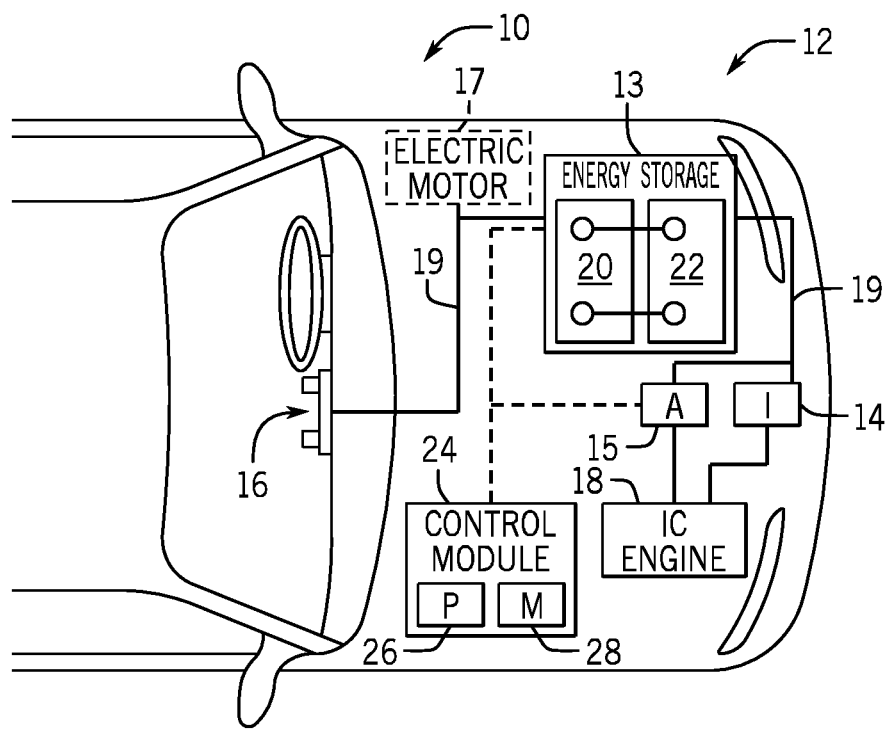
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) an internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

As discussed above, an individual battery cell of the battery module 20 may ultimately contribute to supplying power to a load (e.g., an xEV). For example, FIG. 3 is an exploded perspective view of the battery module 20 having a first battery cell stack 50 and a second battery cell stack 52, each having individual battery cells 56. Cell terminals 58 of the individual battery cells 56 may be electrically coupled to module terminals via one or more bus bars. In some cases, one of the bus bars may be welded to a battery cell terminal 58 to form an electrical connection (e.g., via a physical connection). Welding the bus bar to the battery cell terminal 58 may form a robust electrical connection that may withstand vibrations and/or other movement that the battery module 20 may incur. However, when the battery cell terminal 58 and the bus bar include two different materials (e.g., two different alloys of a metal), a weld formed between the battery cell terminal 58 and the bus bar may have a relatively weak tensile strength. Accordingly, the electrical connection between the battery cell terminal 58 and the bus bar may be subject to interruptions and/or disconnections that may result from movement of the battery module 20. Embodiments of the present disclosure include an improved welding process that may increase the tensile strength of a weld between the cell terminal 58 and the bus bar, even when such components include different materials (e.g., two different alloys of a metal).

In certain embodiments, the individual battery cells 56 may be received from a supplier with the terminals 58 having a first alloy of a metal (e.g., a first alloy of aluminum). For example, the terminals 58 may include a first alloy of a particular metal, such as 5052 aluminum (e.g., an aluminum alloy containing aluminum, magnesium, chromium, copper, iron, manganese, silicon, and/or zinc). Additionally, the battery module 20 may include a bus bar carrier 60, which may include one or more bus bars 61 configured to establish an electrical connection between the individual battery cells 56 and/or between the battery cells 56 and an external load (e.g., the xEV). However, the bus bars 61 may include a second alloy of the particular metal, such as 1100 aluminum (e.g., an aluminum alloy containing aluminum, copper, iron, manganese, silicon, and/or zinc). In some cases, a relatively weak weld may be formed when the first and second alloys of the metal (e.g., aluminum) are welded to one another using traditional techniques. Further, a relatively weak weld may be formed when welding any material to the first alloy of the metal (e.g., 5052 aluminum).

The illustrated embodiment of FIG. 3 also illustrates the battery module 20 having a housing 64, which may receive the first and second battery cell stacks 50, 52. Additionally, the battery module 20 may include a cover 66 for the housing 64. As such, when the battery cells 56 and/or the bus bar carrier 60 are positioned within the housing 64, the cover 66 may be disposed on the housing 64 to enclose the battery module 20 and form a single, integrated unit that may provide power to a load (e.g., the xEV).

Figure 4:
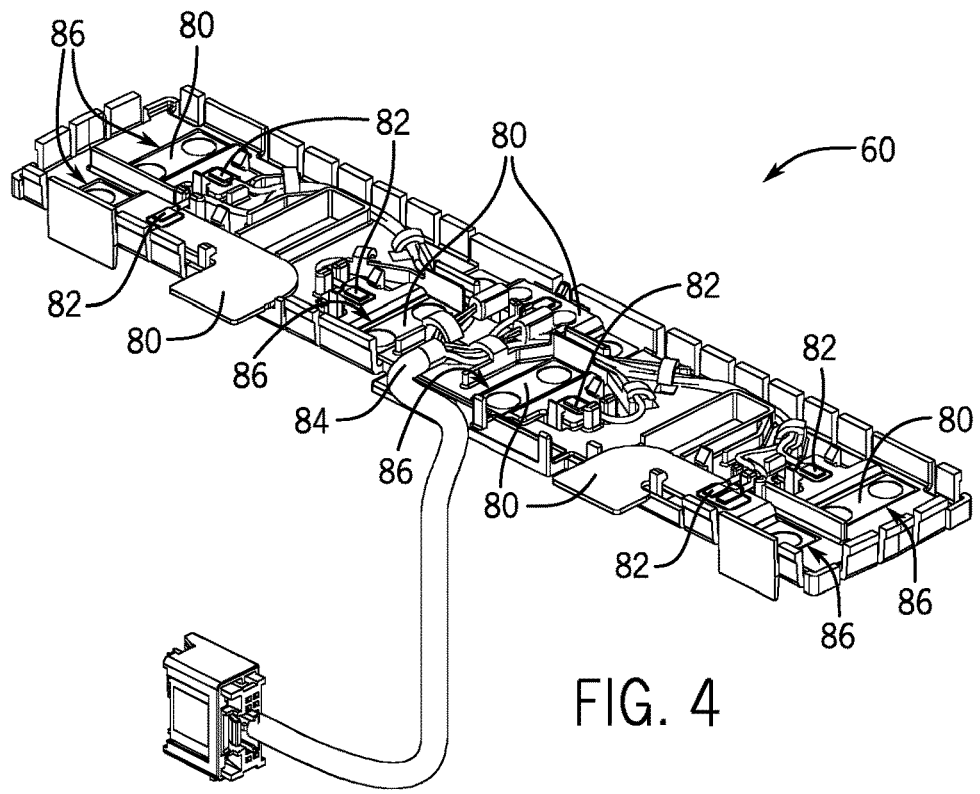
FIG. 4 is a perspective view of a bus bar carrier of the battery module of FIG. 2 that may be disposed over individual battery cells, in accordance with an aspect of the present disclosure.

To establish an electrical connection between the individual battery cells 56 and/or between the battery cells 56 and the load (e.g., the xEV), the terminals 58 of the battery cells 56 may be coupled (e.g., welded) to one or more bus bars of the bus bar carrier 60. For example, FIG. 4 is a perspective view of the bus bar carrier 60 having bus bars 61 configured to be disposed over the terminals 58 of the battery cells 56. In certain embodiments, the bus bars 61 are welded to the terminals 58 such that a physical and/or an electrical connection are established between the bus bars 61 and the terminals 58. The weld formed may be a lap weld that is formed in accordance with presently disclosed laser welding techniques. Such techniques are discussed in more detail below with reference to FIG. 8.

The interconnection of the battery cells 56 using the bus bars 61 may enable a plurality of series and/or parallel connections to be made, resulting in a predetermined voltage and/or capacity of the overall battery module 20. In certain embodiments (e.g., the embodiment of FIG. 3), the battery module 20 may have, for example, six battery cells 56 connected in series to produce a voltage output that is the sum of the individual voltages of the battery cells 56, and a capacity substantially equal to the capacity of an individual battery cell 56. Other electrical connections, such as one or more parallel connections, may affect the voltage and capacity. In other embodiments, the battery module 20 may include less than six battery cells (e.g., 5, 4, 3, 2, or 1) or more than six battery cells (e.g., 7, 8, 9, 10, 12, 15, 20, 25, 30, 35, 40, 45, 50, or more).

In addition to forming the electrical connections using the bus bars 61 of the bus bar carrier 60, the bus bar carrier 60 also includes various sensing components 82 (e.g., sensing components, sensors, or the like) configured to enable the control unit 24 (e.g., controller or battery management system "BMS") of the module 20 to perform monitoring functions with respect to the battery cells 56 and the module 20. The sensing components 82 (e.g., sensors) may include voltage sense components, which are configured to sense voltages at each bus bar 61, as well as temperature sense components, which are configured to sense temperatures at certain bus bars 61. These sensing components 82 are coupled to cabling 84 configured to carry signals generated by the sensing components 82 to the control unit 24 (e.g., the BMS). For example, the sensing components 82 may be electrically coupled to the control unit 24 (e.g., via the cabling 84) and configured to send signals pertaining to a temperature and/or a voltage of the battery module 20 over time. In certain embodiments, the control unit 24 may include a threshold temperature and/or voltage value stored in the memory 28. If a signal received from the sensing components 82 exceeds the threshold value, the control unit 24 may be configured to disconnect a flow of electricity between the battery module 20 and a load, for example.

In certain embodiments, the bus bars 61, the sensing components 82, and the cabling 84 are all integrated onto a one-piece structure (e.g., the bus bar carrier 60) configured to carry and integrate these components. Additionally, the bus bar carrier 60 may include grooves and/or slots 86 that may be configured to receive the bus bars 61 and position the bus bars 61 in a predetermined location (e.g., directly over the terminals 58 of the battery cells 56). Accordingly, during assembly of the battery module 20, the bus bars 61 may simply be placed into the pre-manufactured grooves and/or slots 86 to align the bus bars 61 with the terminals 58 prior to welding.

As discussed above, the bus bars 61 may be configured to electrically couple individual battery cells 56 to one another as well as to electrically couple the battery cells 56 to a load. Accordingly, in certain embodiments, the battery module 20 may include different types of bus bars (e.g., different shapes, sizes, and/or materials). For example, FIG. 5 is a perspective view of the bus bars 61 that may be used in the embodiment of the battery module 20 of FIG. 3, including a cell-to-cell bus bar 100, a stack-to-stack bus bar 102, and a cell-to-load bus bar 104. In the illustrated embodiment of FIG. 5, the bus bars 61 are arranged for a battery module 20 that includes six electrochemical battery cells 56. However, the three types of bus bars 100, 102, and 104 may be utilized in a battery module having more than six battery cells (e.g., 7, 8, 9, 10, or more) or less than six battery cells (e.g., 5, 4, 3, 2, or 1).

The cell-to-cell bus bar 100 may be utilized to establish an electrical connection between two battery cells 56 that are positioned adjacent to one another, for example. When the battery cells 56 are in a series arrangement, the cell-to-cell bus bar 100 may be coupled (e.g., welded) to a positive terminal of a first battery cell of the battery cells 56 and to a negative terminal of a second battery cell of the battery cells 56, which is adjacent to the first battery cell 56. Conversely, when the battery cells 56 are in a parallel configuration, the cell-to-cell bus bar 100 may be coupled (e.g., welded) to a positive terminal of the first battery cell of the battery cells 56 and to a positive terminal of the second battery cell of the battery cells 56. Similarly, the cell-to-cell bus bar 100 may also be coupled to negative terminals of the first battery cell and the second battery cell of the battery cells 56 to establish a parallel configuration.

In certain embodiments, the cell-to-cell bus bars 100 may include a shape that enables the cell-to-cell bus bar 100 to electrically couple two battery cells 56 as well as to provide a platform for the sensing components 82 to monitor the temperature and/or voltage at the cell-to-cell bus bar 100. For example, in the illustrated embodiment of FIG. 5, when viewed from overhead, the cell-to-cell bus bars 100 include a T-shape. The T-shape may enable a first portion 105 of the cell-to-cell bus bars 100 to couple two or more of the battery cells 56 to one another and a second portion 106 of the cell-to-cell bus bars 100 to receive a sensing component 82. However, in accordance with the disclosed welding techniques, the cell-to-cell bus bars 100 may include any suitable shape that enables an electrical connection between two or more battery cells 56 as well as provides a platform for the sensing components 82.

The stack-to-stack bus bar 102 may be included in the battery module 20 when more than one battery cell stack is utilized (e.g., the first and second battery cell stacks 50, 52). For example, in embodiments where only one of the first and second battery cell stacks 50, 52 is utilized in the battery module 20, the stack-to-stack bus bar 102 may not be included because no electrical connection between the first and second battery cell stacks 50, 52 is established. However, in embodiments that include more than one battery cell stack (e.g., the first and second battery cell stacks 50, 52), the stack-to-stack bus bar 102 may be utilized to establish a connection between the first and second battery cell stacks 50, 52. Similar to establishing an electrical connection between individual battery cells 56, the first and second battery cell stacks 50, 52 may be connected in series or in parallel. For example, a negative terminal of a first battery cell of the battery cells 56 of the first battery cell stack 50 may be coupled to a positive terminal of a second battery cell of the battery cells 56 of the second battery cell stack 52 to couple the first and second battery cell stacks 50, 52 in series. Conversely, the first and second battery cell stacks 50, 52 may be electrically coupled (e.g., welded to the stack-to-stack bus bar 102) via a negative terminal of a battery cell of each of the first and second battery cell stacks 50, 52 or a positive terminal of a battery cell of each of the first and second battery cell stacks 50, 52 to couple the first and second battery cell stacks 50, 52 in parallel.

In certain embodiments, the stack-to-stack bus bar 102 may include a body that is substantially planar, but the body may include an elevated portion 107 that enables the stack-to-stack bus bar 102 to extend across the first and second battery cell stacks 50, 52 as well as over obstructing features present within the battery module 20, such as obstructions caused by the bus bar carrier 60. For example, the bus bar carrier 60 may include various ridges and/or protrusions to facilitate placement of the sensing components 82 on the bus bar carrier 60 and/or to enable an interlocking connection with the cover 66. Accordingly, the elevated portion 107 may enable the stack-to-stack bus bar 102 to circumvent such features and establish an electrical connection between the first and second battery cell stacks 50, 52. In other embodiments, the bus bar carrier 60 may not include such ridges and/or protrusions. Therefore, the stack-to-stack bus bar 102 may be substantially flat, such that the elevated portion 107 is not included.

The cell-to-load bus bar 104 may be utilized to couple the battery cells 56 and/or the battery cell stacks 50, 52 to a load (e.g., the xEV). For example, the cell-to-load bus bar 104 may be directly coupled (e.g., welded) to the terminal 58 of a battery cell 56 and the battery module terminal. The battery module 20 may also include a positive terminal and a negative terminal, which may supply electrical power (e.g., cumulative from each of the battery cells 56) to a load (e.g., the xEV). Accordingly, two cell-to-load bus bars 104 may be included in the battery module 20 (e.g., one for the positive battery module terminal and one for the negative battery module terminal). In certain embodiments, the cell-to-load bus bars 104 may be substantially J-shaped such that the cell-to-load bus bar 104 may physically contact the terminal 58 of an individual battery cell 56 as well as the battery module terminal or a terminal shunt of the battery module 20. In other embodiments, the cell-to-load bus bar 104 may include any suitable shape that enables a connection between the battery module terminal and the terminal of a battery cell 56.

As shown in the illustrated embodiment of FIG. 5, the bus bars 61 (e.g., the cell-to-cell bus bars 100, the stack-to-stack bus bars 102, and/or the cell-to-load bus bars 104) may include indentations 108. In certain embodiments, the indentations 108 may be stamped into the bus bars 61. In other embodiments, the indentations 108 may be formed by partially cutting through the thickness of the bus bars 61. The indentations 108 may provide a target for performing a weld that establishes a physical connection (and thus an electrical connection) between the bus bars 61 (e.g., the cell-to-cell bus bars 100, the stack-to-stack bus bars 102, and/or the cell-to-load bus bars 104) and the cell terminals 58. In the illustrated embodiment of FIG. 5, the indentations 108 include a circular shape. However, the indentations 108 may include any suitable shape such as an oval, a rectangle, or a square, for example.

The indentations 108 may have an area as well as a depth (e.g., a penetrating distance into the body of the bus bars 61). In certain embodiments, the area of the indentations 108 may be between 5% and 20% of a total area of a body of the bus bars 61. Additionally, the depth of the indentations 108 may be less than an overall thickness of the bus bars 61. For example, the depth of the indentations 108 may be between 50% and 90% of the total (e.g., combined) thickness of the body of bus bars 61. Moreover, in certain embodiments, the bus bars 61 (e.g., the cell-to-cell bus bars 100, the stack-to-stack bus bars 102, and/or the cell-to-load bus bars 104) may include an opening (e.g., the indentation extends through the entire overall thickness of the bus bars 61) at a point where the weld is formed (e.g., a weld spot). For example, such an opening in the bus bars 61 (e.g., the cell-to-cell bus bars 100, the stack-to-stack bus bars 102, and/or the cell-to-load bus bars 104) may enable a laser from the laser welding device to directly contact the cell terminal 58 such that a temperature of the cell terminal 58 is increased. Accordingly, material of the bus bars 61 as well as material of the cell terminal 58 may melt to form the electrical connection between the bus bars 61 and the cell terminal 58. In such embodiments, the diameter of the opening may be between 0.001 millimeters (mm) and 10 mm. In other embodiments, the bus bars 61 may not include the opening.

In certain embodiments, the bus bars 61 (e.g., the cell-to-cell bus bars 100, the stack-to-stack bus bars 102, and/or the cell-to-load bus bars 104) may include a base material that includes a second alloy of a metal different from the first alloy of the metal included in the terminals 58. For example, the bus bars 61 may include 1100 aluminum (e.g., AL1100-0 material). In accordance with certain embodiments, it is now recognized that a direct laser weld between the first alloy of the metal (e.g., 5052 aluminum or AL5052-T6) and the second alloy of the metal (e.g., 1100 aluminum or AL1100-0) may not form a strong physical and/or electrical connection. It is also now recognized that coating the bus bars 61 with a plating (e.g., a nickel plating) may enhance the strength of the weld between the bus bars 61 and the terminals 58.

In certain embodiments, the nickel plating may be a coating on the bus bars 61 configured to enhance a physical strength of the lap weld between the bus bars 61 and the cell terminals 58. For example, during the welding process, a temperature of the weld materials (e.g., bus bars 61 and the cell terminals 58) may increase. Accordingly, at least a portion of one or both of the materials may melt to from a weld between the two components (e.g., the bus bars 61 and the cell terminals 58). When the nickel plating is utilized on the bus bars 61, the strength of the weld may be enhanced because nickel may be more compatible to laser weld with each of the first alloy of the metal and the second alloy of the metal. Additionally, the nickel plating may include a predetermined thickness, which may enable a stronger (e.g., more corrosion resistant) weld. For example, in certain embodiments, the thickness of the nickel plating may be between 0.2% and 20% of a combined thickness of the base of the bus bar (e.g., the base material (1100 aluminum or AL1100-0)) and the nickel plating). However, in a general sense, the nickel plating may be any suitable thickness that may enable a stronger weld to be formed between the first alloy of the metal (e.g., 5052 aluminum or AL5052-T6) and the second alloy of the metal (e.g., 1100 aluminum or AL1100-0).

In certain embodiments, the nickel plating may include a concentration of phosphorous. The phosphorous may further enhance a strength of the lap weld between the bus bars 61 and the cell terminals 58 by increasing a resistance to corrosion. Phosphorous may also enhance the strength of the lap weld by decreasing a susceptibility of the lap weld to cracking. Additionally, phosphorous may be included in the nickel plating to enhance aesthetic qualities of the bus bars 61 and/or the resulting laser weld. In certain embodiments, the nickel plating disposed on the bus bars 61 (e.g., the cell-to-cell bus bars 100, the stack-to-stack bus bars 102, and/or the cell-to-load bus bars 104) may have a concentration of phosphorous between 1 weight percent (wt. %) and 15 wt. %.

In accordance with the present disclosure, any technique for coating the bus bars 61 with nickel may be used. In certain embodiments, the bus bars 61 may be coated with the nickel plating via an electroless nickel plating technique. Accordingly, nickel may be deposited on the base material (e.g., the second alloy of the metal or 1100 aluminum) via a chemical reaction between a reducing agent and metal ions, for example. Electroless plating techniques dispose the nickel plating onto the base material (e.g., the second alloy of the metal) generally without an electrical charge placed within a coating solution. Rather, chemical reduction and oxidation reactions are facilitated by chemical reducing and oxidizing agents (e.g., as opposed to utilizing electrochemical redox reactions that occur as a result of an electrical potential). In certain embodiments, electroless plating may create a uniform coating of nickel onto the base layer, where the uniform coating includes a predetermined thickness. In certain embodiments, the nickel plating thickness may be between 1 and 15 micrometers (μall), between 2 and 10 μm, between 4 and 8 μm, or any suitable thickness that may enhance a strength of a weld between the cell terminals 58 and the bus bars 61.

Figure 6:
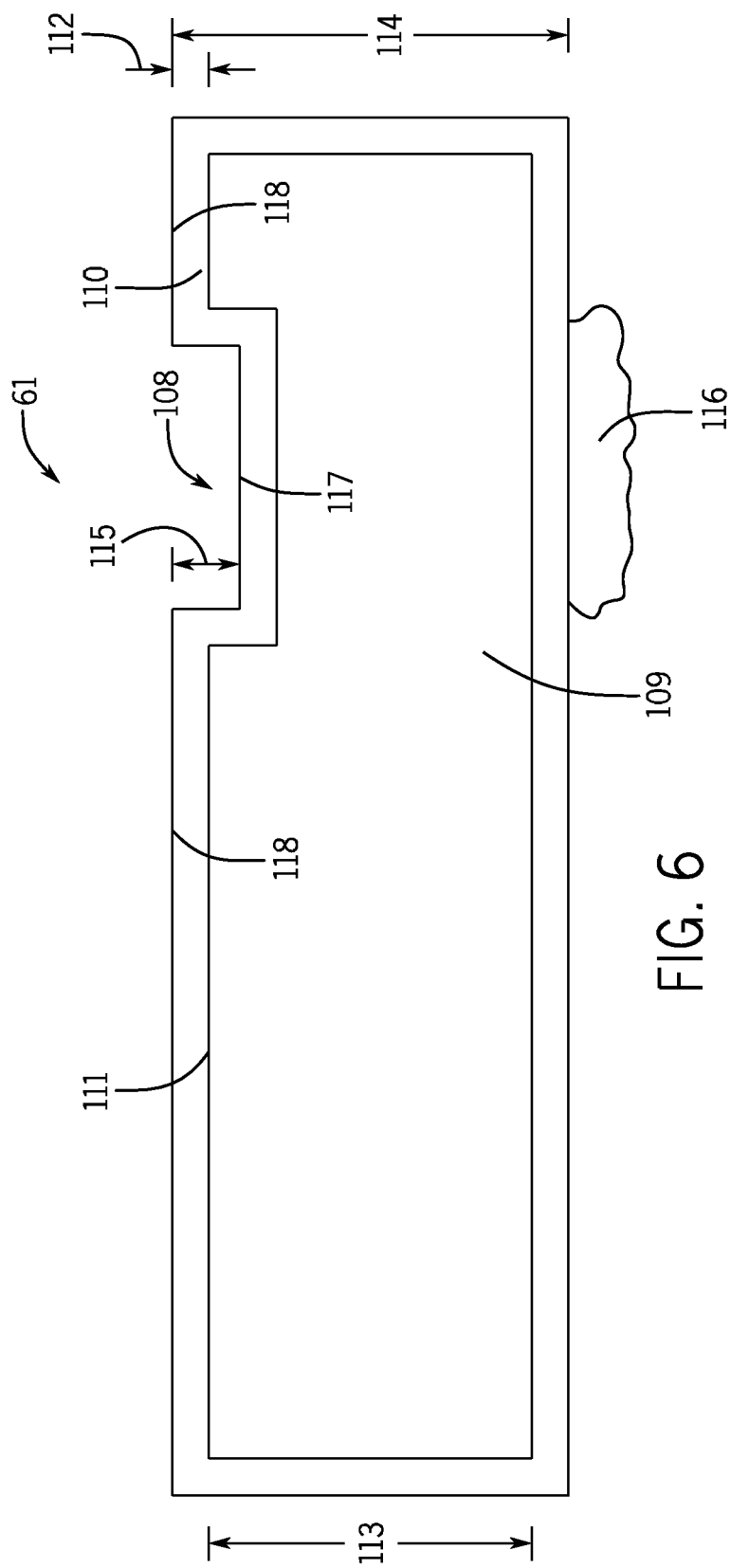
FIG. 6 is a cross section of one of the bus bars having nickel plating disposed over an entire perimeter of the bus bar, including an indentation, in accordance with an aspect of the present disclosure.

The nickel plating of the bus bars 61 is illustrated in FIG. 6, which is a cross section of one of the bus bars 61. For example, the bus bars 61 may have a body 109 that includes the second alloy of the metal (e.g., 1100 aluminum or AL1100-0). Additionally, the body 109 may be coated with nickel plating 110 (e.g., a nickel material that may include phosphorous). As shown in the illustrated embodiment of FIG. 6, the nickel plating 110 is disposed over an entire perimeter 111 of the bus bars 61, including the indentation 108. In other embodiments, the nickel plating 110 may be disposed over a portion of the perimeter 111 (e.g., a first surface of the body 109). In still further embodiments, the nickel plating 110 may be over the entire perimeter 111, except for the indentation 108. Therefore, in such embodiments, the indentation 108 may include the second alloy of the metal (e.g., 1100 aluminum or AL1100-0) without the nickel plating 110. As discussed above, the nickel plating 110 may be utilized to enhance a strength of the weld between the cell terminals 58 and the bus bars 61.

As shown in the illustrated embodiment of FIG. 6, the nickel plating 110 includes a thickness 112 that is uniform throughout the entire perimeter 111 of the bus bars 61. In other embodiments, the thickness 112 of the nickel plating 110 may vary throughout the perimeter 111, or the portion of the perimeter 111 that the nickel plating 110 is disposed on. As discussed above, the thickness 112 of the nickel plating 110 may be between 1 and 15 micrometers (μall), between 2 and 10 μm, or between 4 and 8 μm. Additionally, the body 109 may include a thickness 113. In certain embodiments, the thickness 113 of the body 109 may be predetermined based on an amount of desired energy that may be transferred through the bus bars 61 and toward the cell terminals 58. The thickness 112 of the nickel plating 110 and the thickness 113 of the body 109 may be form an overall thickness 114 of the bus bars 61. The overall thickness 114 may include the thickness 113 of the body 109 as well as the thickness 112 of the nickel plating 110 disposed on both top and bottom surfaces of the bus bars 61 (e.g., when the nickel plating 110 is disposed around the entire perimeter 111 of the bus bars 61).

The illustrated embodiment of FIG. 6 also shows the indentation 108 having a depth 115. As discussed above, the depth 115 of the indentation 108 may be between 50% and 90% of the overall thickness 114. The indentation 108 may provide a target surface for a laser that may transmit energy toward the bus bars 61. In certain embodiments, depth 115 of the indentation 108 may be configured to transfer a sufficient amount of energy through the body 109 of the bus bars 61 such that weld 116 forms between the bus bars 61 and the cell terminals 58. Additionally, in certain embodiments, an area 117 of the indentations 108 may be between 5% and 20% of a total surface area 118 of the body 109 of the bus bars 61.

Figure 7:
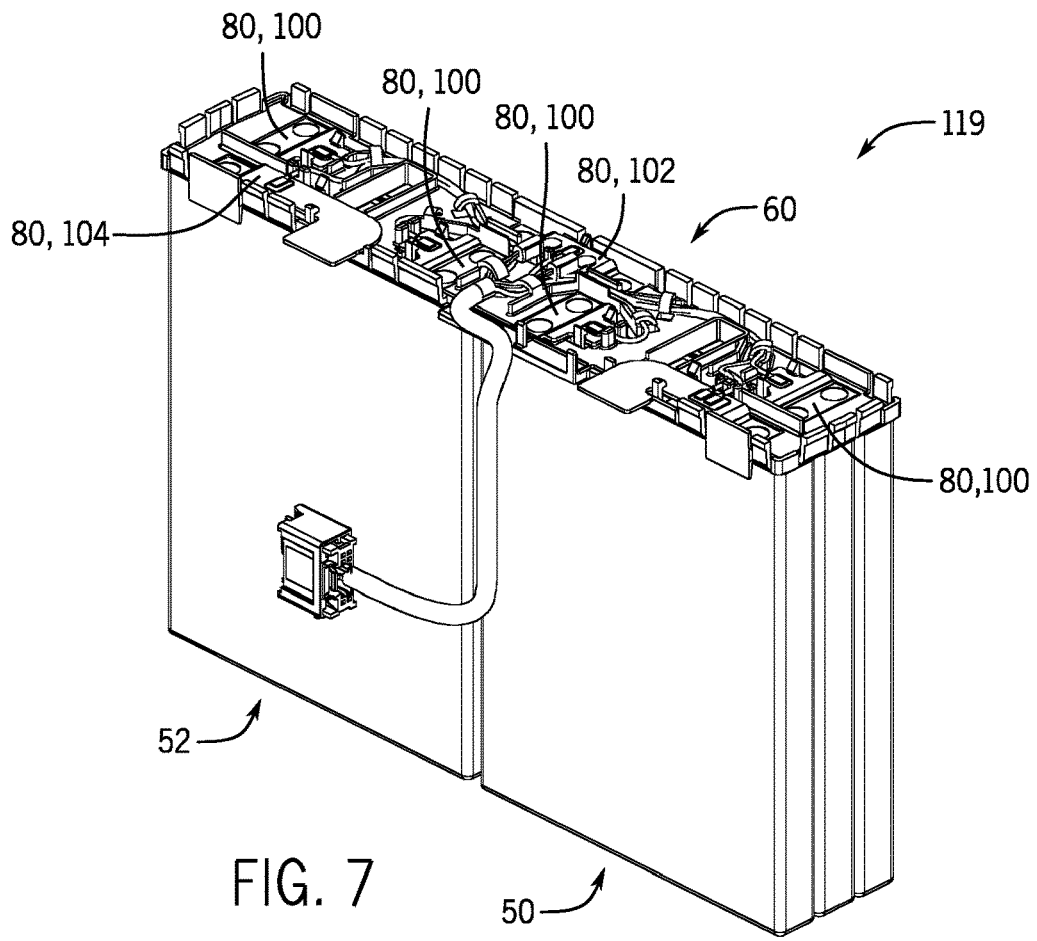
FIG. 7 is a perspective view of a power assembly of the battery module of FIG. 3, in accordance with an aspect of the present disclosure.

The positioning of the bus bars 61 relative to the battery cells 56 may be further appreciated with reference to FIG. 7, which is a perspective view of a power assembly 119 of the battery module 20. The term "power assembly," as used herein, refers to the battery cells 56 coupled together via the bus bars 61 of the bus bar carrier 60. For example, the power assembly 119 may include the bus bar carrier 60 positioned over the battery cell stacks 50, 52, where laser welds between the bus bars 61 and the cell terminals 58 are formed to couple the battery cells 56 to one another. As discussed above, the bus bar carrier 60 may be positioned over the cell terminals 58 prior to the welding process. In certain embodiments, the bus bar carrier 60 may be configured to receive a predetermined number of cell terminals 58. For example, the bus bar carrier 60 illustrated in the power assembly 119 of FIG. 7 is configured to receive six battery cells 56, and thus, twelve cell terminals 58.

Figure 8:
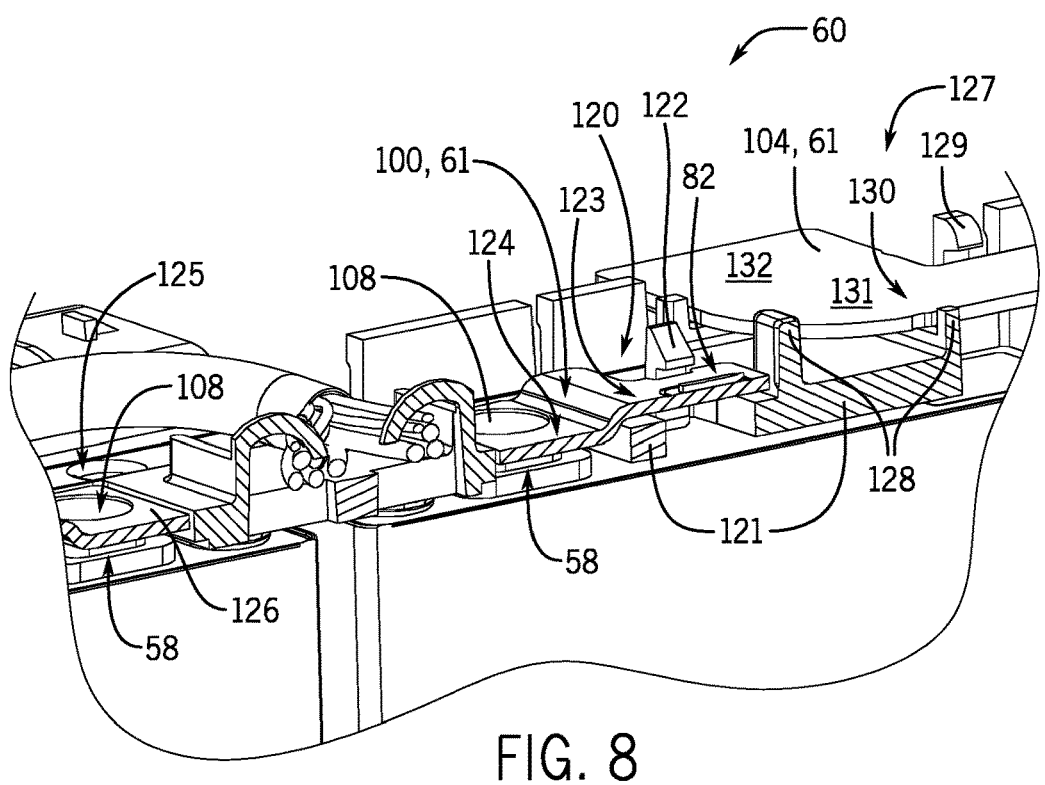
FIG. 8 is a cross-sectional perspective view of the bus bars disposed in the bus bar carrier of FIG. 4, in accordance with an aspect of the present disclosure.

FIG. 8 is a cross-sectional perspective view of the bus bars 61 disposed in the bus bar carrier 60 of FIG. 4. As shown in the illustrated embodiment of FIG. 8, a cell-to-cell bus bar 100 is disposed in a first interface 120 of the bus bar carrier 60. The first interface 120 includes a base portion 121 and a locking member 122. For example, the cell-to-cell bus bar 100 may include a carrier portion 123 that has a first surface and a second surface. The first surface of the carrier portion 123 may be configured to contact (e.g., rest on) the base portion 121 of the first interface 120. Additionally, the second surface of the carrier portion 123 may be positioned proximate to the locking member 122. In certain embodiments, the cell-to-cell bus bar 100 may snap into the first interface 120 such that the cell-to-cell bus bar 100 is substantially secure with respect to the bus bar carrier 60 (e.g., even before laser welding the cell-to-cell bus bar 100 to the cell terminals 58). Accordingly, the first interface 120 may act as an interference fit to secure the cell-to-cell bus bar 100 before the weld is formed between the cell-to-cell bus bar 100 and the cell terminals 58. Further, the cell-to-cell bus bar 100 may include a cell portion 124 that is configured to contact one or more of the cell terminals 58 such that a laser weld may be established between the cell-to-cell bus bar 100 and the one or more cell terminals 58.

In certain embodiments, the cell portion 124 may be offset from the carrier portion 123. As shown by way of example in the illustrated embodiment, the cell portion 124 and the carrier portion 123 may be in different planes (e.g., offset but substantially parallel) with respect to a common plane of the cell terminals 58. Therefore, the cell portion 124 may lie in a first plane and the carrier portion 123 may lie in a second plane. In certain embodiments, the first plane and the second plane may be substantially parallel to one another with respect to the common plane of the cell terminals 58. In such embodiments, the carrier portion 123 may be positioned further from the cell terminals 58 and create a platform for the sensing components 82. It may be desirable to position the sensing components 82 further from the cell portion 124 so that the sensing components 82 are not damaged when the cell portion 124 of the cell-to-cell bus bar 100 is welded to the cell terminals 58. In other embodiments, the cell portion 124 and the carrier portion 123 may be positioned in any suitable configuration such that the cell portion 124 may contact the cell terminals 58 and the carrier portion 123 may contact the base portion 121 of the first interface 120.

As shown in the illustrated embodiment of FIG. 8, the indentation 108 of the cell-to-cell bus bar 100 is substantially aligned with the cell terminals 58 such that the indentation 108 may be utilized as a target weld surface when performing the laser weld. The indentation 108 may include a thickness that is less than a total thickness of the body of the cell-to-cell bus bar 100 so that the indentation 108 may be easily identified by the welder (e.g., able to be identified by an optical tracking system or to the naked eye of a technician).

Additionally, the embodiment of FIG. 8 shows a second interface 125 of the bus bar carrier 60 configured to receive a second cell-to-cell bus bar 126. As shown, the second cell-to-cell bus bar 126 is disposed proximate to the cell terminals 58 such that a laser weld may be formed between the second cell-to-cell bus bar 126 and the cell terminals 58. Additionally, the indentation 108 of the second cell-to-cell bus bar 126 is also substantially aligned with the cell terminals 58 to provide a target weld surface for the welder.

FIG. 8 also illustrates a third interface 127 of the bus bar carrier 60 that may receive cell-to-load bus bars 104. As shown in the illustrated embodiment of FIG. 8, the third interface 127 may include one or more protrusions 128 configured to receive and contact the cell-to-load bus bars 104. Additionally, the third interface 127 includes a second locking member 129 that may be utilized to prevent movement of the cell-to-load bus bars 104 such that the cell-to-load bus bars 104 remain substantially stationary with respect to the bus bar carrier 60. In certain embodiments, the cell-to-load bus bars 104 may snap into place such that the third interface 127 acts as an interference fit.

In certain embodiments, the cell-to-load bus bars 104 may include a cell portion (not shown) and a carrier/load portion 130. As shown in the illustrated embodiment of FIG. 8, the carrier/load portion 130 of the cell-to-load bus bars 104 may include a first segment 131 that rests on the protrusions 128 of the bus bar carrier 60. Additionally, the carrier/load portion 130 may include a second segment 132 that extends beyond the bus bar carrier 60 toward a module terminal or a terminal shunt, such that the cell-to-load bus bars 104 may ultimately be coupled to (e.g., welded) to a load.

Figure 9:
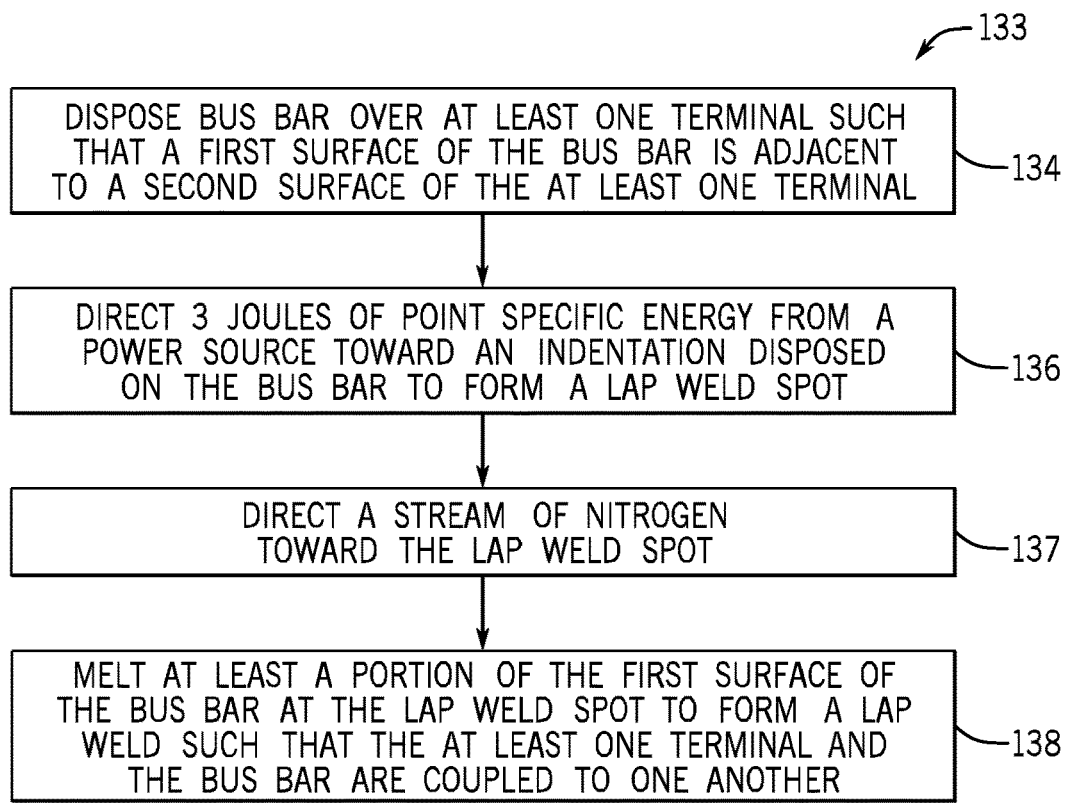
FIG. 9 is a block diagram of an embodiment of a process that may be utilized to form a weld between the bus bars and cell terminals of the battery module of FIG. 3, the weld having an enhanced physical and/or electrical strength, in accordance with an aspect of the present disclosure.

Once the bus bar carrier 60 is disposed over the cell terminals 58, the weld may be formed between the bus bars 61 and the cell terminals 58 to establish an electrical connection (e.g., via physical contact) between the bus bars 61 and the cell terminals 58. In certain embodiments, a welding technique may be utilized to enhance the strength of the weld between the bus bars 61 and the cell terminals 58. For example, FIG. 9 is a method 133 that may be utilized to couple the bus bars 61 (e.g., the cell-to-cell bus bars 100, the stack-to-stack bus bars 102, and/or the cell-to-load bus bars 104) to the cell terminals 58 and form a weld having an enhanced strength when compared to traditional welding techniques.

Accordingly, at block 134, one of the bus bars 61 may be disposed over (e.g., against) at least one cell terminal 58. Therefore, a first surface 135 of the bus bar 61 may be adjacent to a second surface 136 of the at least one cell terminal 58 (see FIG. 11). In certain embodiments, the first surface may physically contact the second surface (see FIG. 10). In other embodiments, the bus bar 61 may include a tab and/or other device configured to form a gap between the first and the second surfaces 135, 136 to decrease a peak temperature of the laser welding process (see FIG. 11). For example, a gap of between 0.01 millimeters (mm) and 10 mm, between 0.05 and 5 mm, between 0.1 millimeters (mm) and 0.5 mm, or any combination thereof may be formed between the first surface 135 of the bus bar and the second surface 136 of the cell terminal. Additionally, disposing the bus bar 61 over the at least one cell terminal 58 in accordance with the acts represented by block 134 may include positioning the bus bar 61 in the bus bar carrier 60 and disposing the bus bar carrier 60 over the battery cell stacks 50, 52. In such embodiments, the bus bar carrier 60 may include the grooves and/or slots 86 that may substantially align the indentations 108 of the bus bar 61 with the at least one cell terminal 58.

At block 137, a predetermined amount of point specific energy may be supplied from a power source (e.g., a weld torch, laser) toward the indentation 108 disposed on the bus bar 61 to form a lap weld spot. As used herein, point specific energy may be determined from at least a weld power, a weld speed, and a weld spot size. Accordingly, point specific energy may be adjusted by varying the weld power, the weld speed, and/or the spot size of the laser. As used herein, the weld power may refer to a power density of a laser emission that is directed toward the indentations 108. Additionally, the weld speed may refer to a speed at which the laser emission moves about (e.g., back and forth or in a circular motion) the weld spot. In certain embodiments, approximately 3 J of point specific energy directed toward the indentation may be formed from a weld power of 1290 Watts (W), a weld speed of 108 millimeters per second (mm/s), and a weld spot size of 0.25 millimeters (mm). In other embodiments, the approximately 3 J of point specific energy may include a weld power of 2000 W, a weld speed of 167 mm/s, and a weld spot size of 0.25 mm; a weld power of 1740 W, a weld speed of 145 mm/s, and a weld spot size of 0.25 mm; a weld power of 1420 W, a weld speed of 118 mm/s, and a weld spot size of 0.25 mm; a weld power of 1160 W, a weld speed of 97 mm/s, and a weld spot size of 0.25 mm; a weld power of 1030 W, a weld speed of 86 mm/s, and a weld spot size of 0.25 mm; or any other suitable combination of weld power, weld speed, and weld spot size that generates 3 J of point specific energy. In still further embodiments, between 0.5 J and 5 J, between 1 J and 4 J, or between 2 J and 3 J of point specific energy may be directed at the indentation 108 to form the lap weld spot.

In certain embodiments, the bus bars 61 (e.g., the cell-to-cell bus bars 100, the stack-to-stack bus bars 102, and/or the cell-to-load bus bars 104) may include a non-uniform thickness, such that the thickness varies throughout a cross-section of the body of the bus bars 61. For example, due to manufacturing imperfections (e.g., engineering tolerances) the bus bars 61 may not include a uniform thickness throughout. However, the bus bars 61 may include a predetermined thickness at the lap weld spot. For example, the indentations 108 of the bus bars 61 may have a predetermined thickness of between 10% and 100% of a total thickness of the bus bars 61 (e.g., the thickness of the base material and the nickel plating). The predetermined thickness of the indentations 108 may be configured to enable a sufficient amount of thermal energy to be conducted through the bus bar 61 and toward the second surface 136 (see FIG. 11) of the at least one cell terminal 58, such that a weld may form between the bus bar 61 and the at least one cell terminal 58.

In certain embodiments, the lap weld spot may be configured to have an area less than or equal to the area of the indentation 108. In still further embodiments, the point specific energy may not be directed at the indentation 108, but at another area of the bus bar 61 positioned over the at least one cell terminal 58, such that the physical connection between the bus bar 61 and the at least one cell terminal 58 may be established.

At block 138, nitrogen gas may be directed toward the lap weld spot. In certain embodiments, the lap weld may be formed using laser welding. When using such welding processes, a shielding gas may be used to prevent oxygen and/or water from reaching the weld spot, thereby decreasing a weld porosity (e.g., a percentage of oxygen, water vapor, and/or other contaminants in the weld) of the lap weld. Accordingly, the shielding gas may decrease the weld porosity of the lap weld, and thus, ultimately enhance the strength of the weld.

At block 139, at least a portion of the first surface 135 (see FIG. 11) of the bus bar 61 may melt to form a molten metal material at the lap weld spot. Accordingly, when the molten metal material re-solidifies (e.g., hardens), the lap weld may be formed and the bus bar may be physically and/or electrically coupled to the at least one cell terminal 58. For example, during the weld process, the power source (e.g., the weld torch, the arc, a laser) may increase a temperature of the weld components (e.g., the bus bar 61 and the at least one cell terminal 58). This increase in temperature may cause at least a portion of the weld components to melt, thereby producing the molten metal material (e.g., the first and/or second alloys of a metal and/or nickel). When the power source (e.g., the weld torch and/or the arc) is removed from the lap weld spot, the temperature decreases, thereby enabling the molten metal to re-solidify (e.g., harden) and adhere to both weld components (e.g., the bus bar 61 and the at least one cell terminal 58), thereby coupling the weld components to one another.

In certain embodiments, the lap weld that is formed in accordance with the method 133 may produce a weld having certain characteristics (e.g., an enhanced strength, an enhanced weld porosity). For example, the lap weld may include a tensile strength of between 300 Newtons (N) and 1000 N, between 500 N and 900 N, or between 750 N and 800 N. Additionally, the lap weld may include a relatively low weld porosity. As used herein, weld porosity may be a percentage representing an amount of gas and/or other contaminants (e.g., oxygen, other gases, and/or water vapor) trapped in the weld after the molten metal material re-solidifies. Utilizing nitrogen as the shielding gas may reduce weld porosity because nitrogen has a low molecular weight, and thus nitrogen may not affect weld porosity as significantly as a heavier shielding gas. A smaller weld porosity may correspond to a stronger weld because the weld is more dense. In certain embodiments, the lap weld produced using the method 133 may include a weld porosity of between 10% and 80%, between 20% and 60%, or between 30% and 40%. Weld porosity may be determined by performing a computerized tomography (CT) scan on the weld and calculating a percentage of porous volume present in the total weld volume. In other embodiments, the lap weld may include any suitable weld porosity that may result in a lap weld between the bus bar 61 (e.g., the cell-to-cell bus bar 100, the stack-to-stack bus bar 102, and/or the cell-to-load bus bar 104) and the at least one cell terminal 58 having an increased tensile strength and/or electrical strength.

The lap weld formed using the method 133 may also include a relatively low electrical resistance. For example, in some cases, forming a weld between the bus bar 61 (e.g., the cell-to-cell bus bars 100, the stack-to-stack bus bars 102, and/or the cell-to-load bus bars 104) and the at least one cell terminal 58 to create an electrical connection may create a resistance to electrical current flow because of imperfections in the weld. Accordingly, a lower electrical resistance of the lap weld may be desirable to increase a strength of an electrical connection between the bus bar 61 and the at least one cell terminal 58. In certain embodiments, the electrical resistance of the lap weld formed using the method 133 may be between 0.0001 milli-Ohms (mΩ) and 0.005 mΩ, between 0.0003 mΩ and 0.003 mΩ, or between 0.0005 mΩ and 0.001 mΩ. In other embodiments, the lap weld may include any suitable electrical resistance that may result in a lap weld between the bus bar 61 and the at least one cell terminal 58 having an increased physical and/or electrical strength.

In certain embodiments, the point specific energy of the lap weld may determine a penetration depth into the at least one cell terminal 58. In certain embodiments, it may be desirable to decrease the penetration depth of the lap weld into the at least one cell terminal 58 to avoid causing damage to the battery cell 56 and/or affecting the strength of the electrical connection between the bus bar 61 and the at least one cell terminal 58. In certain embodiments, the lap weld formed using the method 133 may have a penetration depth of between 0.5 millimeters (mm) and 1 mm, between 0.6 mm and 0.9 mm, or between 0.75 mm and 0.85 mm (see FIG. 10). In other embodiments, the lap weld may include any suitable penetration depth that may result in a lap weld between the bus bar 61 and the at least one cell terminal 58 having increased physical and/or electrical strength.

Forming a weld using the method 133 may also produce a lap weld having an increased strength compared to traditional techniques because the process may maintain a relatively low peak temperature. As used herein, peak temperature may be a maximum temperature of the weld components (e.g., the bus bar 61 and the at least one cell terminal 58) during the weld process. In certain embodiments, it may be desirable to utilize a peak temperature value that is hot enough to melt at least a portion of one or more of the weld components (e.g., the bus bar 61 and the at least one cell terminal 58), but is not so hot that damage may occur to sensitive components in the battery module (e.g., the sensing components 82 disposed in the bus bar carrier 60, the electrodes of the battery cells 56, or materials sealing the cell terminals 58). Using the welding process shown in the method 133 may enable the lap weld to be formed with a peak temperature of between 60 degrees Celsius (° C.) and 250° C., between 70° C. and 200° C., between 80° C. and 90° C., or any combination thereof. Such peak temperature values may enable a strong weld between the bus bar 61 and the at least one cell terminal 58, while preventing damage to sensitive components in the battery module 20. In other embodiments, the process shown in method 133 may include any suitable peak temperature that may form a lap weld between the bus bar 61 and the at least one cell terminal 58 having increased physical and/or electrical strength.

The characteristics of the lap weld formed using the method 133 may depend at least partially on a diameter and/or area of the lap weld. For example, a larger diameter and/or area of the lap weld may form a stronger weld, but may result in a higher peak temperature at the cell terminal 58 during welding. Similarly, a larger diameter and/or area may decrease electrical resistance, but may result in a higher peak temperature at the cell terminal 58 during welding. Accordingly, it should be appreciated that there is a delicate balance between electrical resistance, weld strength, and peak temperature when determining the diameter and/or area for the weld. In certain embodiments, an area of the indentation 108 disposed on the bus bar 61 may correspond to a desired area of the lap weld. Therefore, a welder may utilize the indentation 108 as a guide during the welding process. In certain embodiments, the diameter of the lap weld may be between 0.5 millimeters and 10 mm, between 0.75 mm and 7.5 mm, between 1 mm and 5 mm, or any combination thereof. Similarly, the area of the lap weld may be between 5 square millimeters ($mm^2$) and 30 $mm^2$, between 7.5 $mm^2$ and 20 $mm^2$, between 10 $mm^2$ and 15 $mm^2$, or any combination thereof. In other embodiments, the lap weld may include any suitable diameter and/or area that may form a lap weld between the bus bar 61 and the at least one cell terminal 58 having increased physical and/or electrical strength.

When the lap weld is formed between the bus bar 61 and the at least one cell terminal 58, a substantially permanent electrical connection may be established. FIG. 10 is a cross-sectional view of one such electrical connection formed by a lap weld between a portion of one of the cell-to-cell bus bars 100 and one of the cell terminals 58. It should be noted that similar lap welds may be established between the stack-to-stack bus bars 102 and one of the cell terminals 58, as well as between the cell-to-load bus bars 104 and one of the cell terminals 58. As shown in the illustrated embodiment of FIG. 10, the cell-to-cell bus bar 100 and the cell terminal 58 are in direct contact with one another, such that an electrical connection is established via physical contact. Forming a lap weld between the cell-to-cell bus bar 100 and the cell terminal 58 may prevent an inadvertent disconnect of electrical current from the battery cell 56 because the lap weld forms a physical connection that secures the cell-to-cell bus bar 100 to the cell terminal 58.

FIG. 10 also illustrates a weld penetration depth 140 of the weld into the cell terminal 58. Accordingly, the predetermined amount of point specific energy may determine the weld penetration depth 140, and thus, the predetermined amount of point specific energy may be selected such that the weld penetration depth 140 does not damage the cell terminal 58. For example, damage may occur when the point specific energy is so high that the weld penetration depth 140 extends through the entire cell terminal 58.

Additionally, a surface of the cell-to-cell bus bar 100 may be positioned adjacent to a surface of the cell terminal 58. In certain embodiments, the surface of the cell-to-cell bus bar 100 may lie substantially flat on the surface of the terminal 58. In other embodiments, a gap 146 may be formed between the surface of the cell-to-cell bus bar 100 and the surface of the terminal 58 via a tab on the cell-to-cell bus bar 100. For example, FIG. 11 illustrates a tab 141 extending from a first surface 135 of the body 109 of the cell-to-cell bus bar 100 and contacting a second surface 136 of the cell terminal 58. Accordingly, the gap 146 forms between the first surface 135 and the second surface 136. As discussed above, the gap 146 may include a distance between 0.01 millimeters (mm) and 1 mm, between 0.05 and 5 mm, between 0.1 millimeters (mm) and 0.5 mm, or any other suitable distance. In certain embodiments, the tab 141 is separate from the indentations 108 of the bus bars 61. However, in other embodiments, the tab 141 may be formed from the indentations 108 of the bus bars 61 (e.g., the indentations 108 create a protrusion extending from the first surface 135 of the bus bars 61 creating the tab 141).

In certain embodiments, it may be desirable to utilize the tab 141 to form the gap 146 between the first surface 135 and the second surface 136 to at least partially insulate the second surface 136 of the cell terminal 58. Accordingly, the peak temperature may decrease when the tab 141 is included on the cell-to-cell bus bar 100 because thermal energy cannot conduct directly from the bus bars 61 toward the cell terminal 58 as a result of minimal surface contact between the bus bars 61 and the cell terminals 58. Additionally, the tab 141 and the gap 146 may reduce the weld porosity of the lap weld. For example, the gap 146 may enable gas generated during the welding process (e.g., fumes) to be directed away from the lap weld spot before the molten metal material re-solidifies and forms a finalized lap weld. Further, the tab 141 may enable the second metal alloy of the cell-to-cell bus bar 100 to melt without melting the first metal alloy of the cell terminals 58. Accordingly, molten, second metal alloy may fall from the first surface 135 and into the gap 146 to form a weld between the cell-to-cell bus bar 100 and the cell terminals 58. Accordingly, it is now recognized that utilizing one of the cell-to-cell bus bars 100 having the tab 141, and thus forming the gap 146, may be desirable to decrease the peak temperature that occurs during the welding process as well as to decrease the weld porosity of the finalized lap weld because such effects may increase a physical and/or electrical strength of the lap weld.

Based on the foregoing description, it may be appreciated that several weld parameters may be subject to modification and variation across different systems (e.g., different types of welded materials and/or different types of components being welded). Table 1 is a data table representing example weld operating parameters that may be used in accordance with the method 133 described above with respect to FIG. 9. To demonstrate the manner in which the method 133 may produce enhanced weld properties, Table 2 depicts weld operating parameters that correspond to traditional weld techniques (e.g., a fillet weld). For example, the operating parameters of Table 1 utilize a point specific energy of 3 J, whereas the traditional operating parameters shown in Table 2 utilize a point specific energy of 2.5 J. The difference of 0.5 J in point specific energy may enable a more robust weld due to increased melting of the bus bars 61 and the cell terminals 58. However, the increased point specific energy may not be so great that damage occurs to the cell terminals 58. Additionally, the parameters depicted in Table 1 utilize nitrogen as a shielding gas, whereas the parameters in Table 2 use no shielding gas (e.g., when the traditional weld is a fillet weld). Further, the parameters of Table 1 do not utilize an opening in the bus bars 61 (the "bus bar hole diameter" is 0 millimeters), whereas the parameters shown in Table 2 include an opening in the bus bars 61 of approximately 5 millimeters.

TABLE 1

Example of Weld Operating Parameters
in Accordance with the Method 133

| A Point Specific Energy (J) | B Welding Shielding Gas | D Bus Bar Thickness at Weld (mm) | E Bus Bar Hole Diameter at Weld (mm) | F Nickel Plating Thickness (µm) | G Nickel Plating Phosphorous (wt. %) |
|---|---|---|---|---|---|
| 3 | Nitrogen | 0.75 | 0 | 4-8 | 9-12% |

TABLE 2

Example of Weld Operating Parameters in Accordance
with Traditional Weld Techniques

| A Point Specific Energy (J) | B Welding Shielding Gas | D Bus Bar Thickness at Weld (mm) | E Bus Bar Hole Diameter at Weld (mm) | F Nickel Plating Thickness (µm) | G Nickel Plating Phosphorous (wt. %) |
|---|---|---|---|---|---|
| 2.5 | None | 0.5 | 5 | 4-8 | 5-8% |

Tables 3-6 are data tables comparing experimental results for a first weld formed using the traditional weld techniques (according to the parameters in Table 2) and a second weld formed in accordance with the presently disclosed embodiments (according to the parameters in Table 1).

For example, Table 3 is a data table showing experimental results of tensile strength ($\beta$) and robustness (S/N) of a first weld (e.g., labeled "Traditional") performed using traditional weld techniques and a second weld 158 (e.g., labeled "Enhanced") performed using weld techniques in accordance with the present disclosure. As shown in the illustrated embodiment of Table 3, the tensile strength and the robustness of the second weld are substantially greater than those of the first weld. For example, the second weld incurred a gain of approximately 266.4 N/mm$^2$ for the tensile strength and approximately 5.9 dB for the robustness. Accordingly, using the presently disclosed welding techniques may enable an assembler or a manufacturer of a battery module to perform stronger and more robust welds, thereby enhancing a durability of the battery module.

TABLE 3

Experimental Results of Tensile Strength ($\beta$) and
Robustness (S/N) for a First Weld and a Second Weld

|  | $\beta$ | S/N |
|---|---|---|
| Traditional | 122.697 | 2.585 |
| Enhanced | 389.08 | 8.48173 |
| GAIN | 266.38 | 5.9 |

Similarly, Table 4 is a data table comparing experimental results from a test that measured peak temperature (e.g., measured in degrees Celsius) during a welding process for the second weld (e.g., Enhanced) with a peak temperature range for the first weld (e.g., Traditional).

TABLE 4

Experimental Results of Peak Temperature During Welding for a Second Weld Compared to a Peak Temperature Range for a First Weld

| Run | Peak Temperature (° C.) |
| --- | --- |
| Traditional | 160-180 |
| Enhanced | 71.30 |

Additionally, Table 5 is a data table showing experimental results of weld porosity. The data table shows the weld porosity for the first and second welds both when the tab 141 was included in the bus bar 61 (e.g., labeled "N1") and when the tab was not included in the bus bar 61 (e.g., labeled "N2"). As shown in Table 5, the weld porosity for the second weld was generally higher than that of the first weld. Accordingly, more gas may have been trapped in the lap weld as a result of utilizing the nitrogen shielding gas. However, as shown in Table 2, no shielding gas was utilized to form the first weld, and thus, less gas may have been trapped in the first weld as a result. Although the weld porosity was generally higher for the second weld, the increase in weld porosity was not significant, especially when compared to the increase in tensile strength and robustness achieved by the second weld.

TABLE 5

Experimental Results of Weld Porosity for a First Weld and a Second Weld

| Run | Noise | Weld Area | Porosity Area | Porosity % |
| --- | --- | --- | --- | --- |
| Traditional | N1 | 128956 | 10176 | 7.3% |
|  | N2 | 147101 | 44152 | 23.1% |
| Enhanced | N1 | 135395 | 59634 | 30.6% |
|  | N2 | 105191 | 66310 | 38.7% |

Finally, Table 6 is a data table showing experimental results of the weld penetration depth 140 into one or more cell terminals 58. For example, the first weld and the second weld were each performed on a positive terminal 194 of one of the battery cells 56 and a negative terminal 196 of the battery cells 56. Additionally, the first and second welds were performed using the bus bar 61 having the tab 141 (e.g., labeled "N1") as well as using one of the bus bars 61 that did not include the tab 141 (e.g., labeled "N2"). As shown in Table 6, the weld penetration depth 140 of the second weld was generally less than the weld penetration depth 140 of the first weld. Accordingly, the second weld produced a greater tensile strength than the first weld, and the second weld did not penetrate as far into the cell terminals 58 as the first weld.

TABLE 6

Experimental Results of Weld Penetration Depth for a First Weld and a Second Weld

| | | Weld Penetration (mm) | | |
| --- | --- | --- | --- | --- |
| Run | Noise | L | R | Average |
| Traditional | N1 | 1.12 | 0.94 | 1.03 |
|  | N2 | 1.01 | 0.91 | 0.96 |
| Enhanced | N1 | 0.88 | 0.8 | 0.84 |
|  | N2 | 0.86 | 0.8 | 0.83 |

One or more of the disclosed embodiments, alone or in combination, may provide one or more technical effects useful in the manufacture of battery modules, and portions of battery modules. In general, embodiments of the present disclosure include an improved welding technique for welding a bus bar having a first alloy of a metal (e.g., 1100 aluminum or AL1100-0 material) to a cell terminal having a second alloy of the metal (e.g., 5052 aluminum or AL5052-T6 material). The improved welding technique may utilize a nickel plating on the bus bar to generate a lap weld having a greater tensile strength and robustness than traditional welding techniques, which may enhance a lifetime of a battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a stack of battery cells disposed in a housing, wherein each battery cell of the stack of battery cells comprises a terminal, and wherein the terminal comprises a first alloy of a metal;
a plurality of bus bars, wherein each bus bar of the plurality of bus bars comprises a body including
an overall thickness,
a second alloy of the metal, and
an indentation disposed in the body; and
a weld physically and electrically coupling the terminal of each battery cell of the stack of battery cells to one of the plurality of bus bars, wherein the indentation comprises a depth at the weld between 10% and 90% of the overall thickness of the body of the one of the plurality of bus bars the weld is coupled to.

2. The battery module of claim 1, wherein an area of the indentation at the weld is between 5% and 20% of an overall area of the body.

3. The battery module of claim 1, wherein the indentation is aligned with the terminal.

4. The battery module of claim 1, wherein the weld comprises a diameter of between 1 mm and 5 mm and an area of between 5 square millimeters (mm$^2$) and 15 mm$^2$.

5. The battery module of claim 1, wherein the first alloy of the metal is 5052 aluminum and the second alloy of the metal is 1100 aluminum.

6. The battery module of claim 1, wherein the bus bar comprises a tab configured to form a gap between the bus bar and the terminal.

7. The battery module of claim 1, wherein the weld comprises a tensile strength of between 500 Newtons (N) and 800 N.

8. The battery module of claim 1, wherein the weld comprises a weld porosity of between 10% and 40%.

9. The battery module of claim 1, wherein the bus bar is a cell-to-cell bus bar, a stack-to-stack bus bar, a cell-to-load bus bar, or any combination thereof.

10. The battery module of claim 1, wherein the bus bar comprises a cell-to-cell bus bar, wherein a first portion of the cell-to-cell bus bar couples a first battery cell of the stack of battery cells to a second battery cell of the stack of battery cells, and wherein a second portion of the cell-to-cell bus bar is coupled to a sensing component of the battery module.

11. The battery module of claim 1, wherein at least a portion of the body is covered by nickel plating, and wherein the nickel plating enables the weld to be stronger than a direct weld between the first alloy of the metal and the second alloy of the metal.

12. The battery module of claim 11, wherein a thickness of the nickel plating is between 0.2% and 20% of an overall thickness of the body.

13. The battery module of claim 11, wherein the nickel plating comprises a phosphorous concentration of between 1 weight percent and 15 weight percent.

14. The battery module of claim 11, wherein the weld comprises a diameter of between 1 mm and 5 mm and an area of between 5 square millimeters ($mm^2$) and 15 $mm^2$.

15. The battery module of claim 11, wherein the first alloy of the metal is 5052 aluminum and the second alloy of the metal is 1100 aluminum.

16. The battery module of claim 11, wherein the bus bar comprises a tab configured to form a gap between the bus bar and the terminal.

17. The battery module of claim 11, wherein the weld comprises a tensile strength of between 500 Newtons (N) and 800 N.

18. The battery module of claim 11, wherein the weld comprises a weld porosity of between 10% and 40%.

19. The battery module of claim 11, wherein the bus bar is a cell-to-cell bus bar, a stack-to-stack bus bar, a cell-to-load bus bar, or any combination thereof.

20. The battery module of claim 11, wherein the bus bar comprises a cell-to-cell bus bar, wherein a first portion of the cell-to-cell bus bar couples a first battery cell of the stack of battery cells to a second battery cell of the stack of battery cells, and wherein a second portion of the cell-to-cell bus bar is coupled to a sensing component of the battery module.

* * * * *